United States Patent
Rowe

(10) Patent No.: US 7,111,464 B2
(45) Date of Patent: Sep. 26, 2006

(54) ACCELERATION CONTROL IN MULTI SPOOL GAS TURBINE ENGINE

(75) Inventor: Arthur L. Rowe, Derby (GB)

(73) Assignee: Rolls-Royce plc, London (GB)

( * ) Notice: Subject to any disclaimer, the term of this patent is extended or adjusted under 35 U.S.C. 154(b) by 285 days.

(21) Appl. No.: 10/790,693

(22) Filed: Mar. 3, 2004

(65) Prior Publication Data
US 2004/0187473 A1 Sep. 30, 2004

(30) Foreign Application Priority Data
Mar. 26, 2003 (GB) .................... 0307035.6

(51) Int. Cl.
*F02D 9/28* (2006.01)
(52) U.S. Cl. ..................... 60/791; 60/39.281
(58) Field of Classification Search ............ 60/791, 60/39.27, 39.281
See application file for complete search history.

(56) References Cited
U.S. PATENT DOCUMENTS

| | | | |
|---|---|---|---|
| 4,104,876 A | 8/1978 | Larsen et al. | |
| 4,422,289 A | 12/1983 | Langton | |
| 4,432,201 A | 2/1984 | Hawes | |
| 4,651,518 A * | 3/1987 | McLaughlin et al. | .... 60/39.281 |
| 5,303,545 A * | 4/1994 | Larkin | ...... 60/39.281 |
| 6,353,790 B1 * | 3/2002 | Tsuzuki | ...... 701/100 |

* cited by examiner

Primary Examiner—Louis J. Casaregola
(74) Attorney, Agent, or Firm—Oliff & Berridge, PLC

(57) ABSTRACT

A gas turbine engine system comprises a first compression stage; a second compression stage; a combustor; a controller; a first sensor for sensing the speed of the first compression stage and providing a first indication of the sensed speed to the controller; and a second sensor for sensing the speed of the second compression stage and providing a second indication of the sensed speed to the controller, wherein the controller is operable to control the supply of fuel to the combustor in dependence upon the first indication received from the first sensor and the second indication received from the second sensor. This arrangement is particularly useful in controlling the acceleration of an aeroengine from minimum idle.

20 Claims, 3 Drawing Sheets

ACCELERATION CONTROL IN MULTI SPOOL GAS TURBINE ENGINE

Embodiments of the present invention relate to the controlled acceleration of a gas turbine multi-spool engine. In particular, they relate to the controlled acceleration of a multi-spooled gas turbine aero-engine from minimum idle.

An aero-engine must have rapid acceleration from low power to high power. In particular it must be able to accelerate from approach (high) idle and from minimum (low) idle within specified minimum times. Approach (high) idle is the minimum level of thrust used during the landing phase and minimum (low) idle is the minimum level of thrust used at all other flight phases. It is lower than approach (high) idle.

One trend in modern aircraft is towards lowering the minimum level of thrust at idle. Another trend is towards increasing the acceleration rate from idle. A consequence of this is that greater and greater acceleration demands are being placed upon aero-engines.

It is important not only to accelerate the engine quickly but to do so in a controlled manner. Over powering the high pressure compressor (HPC) of a multi-spool engine can cause over pressure and surge. During surge, the flow in the compressor becomes unstable and breaks down and the engine does not work.

FIG. 1 illustrates a present-day closed loop speed derivative acceleration control system 1 suitable for controlling the acceleration of a multi-spool engine 4 from approach and/or minimum idle to a predetermined engine thrust within a predetermined time. The system 1 provides consistent acceleration times while avoiding surge.

The system 1 includes a controller 2, a fuel supply controller 6 and an engine 4. The controller 2 has a first input node 10, a second input node 11, a third input node 12 and an output node 21. The first, second and third input nodes are connected to the engine 4. The output node 21 is connected to the fuel supply controller 6, which controls the fuel input 22 to the engine 4. The closed loop controls the rate of change of the HPC shaft speed by modulating the fuel supplied to the engine's combustor using the fuel supply controller 6.

The first input node 10 receives a value P2 that represents the engine inlet stagnation pressure divided by the sea level reference pressure. The second input node 11 receives a value T2 that represents the engine inlet stagnation temperature divided by the sea level reference temperature. The third input node 12 receives a value NH that represents the instantaneous speed of the high pressure compressor (HPC) shaft.

The controller 2 uses a predetermined schedule 8, which schedules rate of change of HPC speed against engine power level and flight conditions. A corrected acceleration of the HPC shaft is scheduled against an instantaneous corrected speed of the HPC shaft. This schedule is designed so that a predetermined engine thrust can be achieved within a predetermined time from idle. The scheduled corrected acceleration is given by NHdotS/P2, where NHdotS is the scheduled rate of change of NH. The corrected speed of the HPC shaft is given by $NH/\sqrt{T2}$. The schedule may be defined as $NHdotS/P2 = f(NH/\sqrt{T2})$.

The square root of T2 is a turbo machinery correction that takes account of the speed of sound, which is proportional to the square root of temperature. P2 is a measure of the amount of air going through the engine. As the altitude of the aircraft increases P2 decreases and more work is required to produce the same amount of mass flow by the engines. As the aircraft speed increases the pressure increases and less work is required for the same mass flow.

In the controller 2, T2 is square rooted 30 and the HPC instantaneous speed NH is divided 31 by the square root of T2 to create a corrected instantaneous HPC speed. The corrected instantaneous speed is input to the schedule 8. The schedule outputs the scheduled corrected acceleration value NHdotS/P2. This is multiplied 35 by P2 to produce the scheduled acceleration NHdotS. Meanwhile, the instantaneous speed of the HPC shaft NH is differentiated 33 with respect to time to find the actual acceleration NHdot of the HPC shaft. The actual acceleration NHdot is subtracted 34 from the scheduled acceleration NHdotS to produce an error signal NHdotE, which represents how much the acceleration of the engine is off-schedule. The error signal NHdotE is output from the output node 21 to the fuel controller 6.

The schedule 8 is designed to maintain a surge margin between a surge line and the transient working line excursion for the HPC on acceleration from minimum idle while still achieving the predetermined engine thrust within the predetermined time. The surge margin takes into account that the surge line lowers as the engine ages.

It would be desirable to improve the control of the acceleration of a multi-spool aero-engine from idle.

According to one aspect of the present invention there is provided a gas turbine engine system comprising: a first compression stage; a second compression stage; a combustor; a controller; a first sensor for sensing the speed of the first compression stage and providing a first indication of the sensed speed to the controller; and a second sensor for sensing the speed of the second compression stage and providing a second indication of the sensed speed to the controller, wherein the controller is operable to control the supply of fuel to the combustor in dependence upon the first indication received from the first sensor and the second indication received from the second sensor. The controller may or may not be incorporated as part of the gas turbine engine.

According to another aspect of the present invention there is provided a multi-spool gas turbine engine comprising: a first spool; a second spool; a combustor; a controller; a first sensor for sensing the speed of the first spool and providing a first indication of the sensed speed to the controller; and a second sensor for sensing the speed of the second spool and providing a second indication of the sensed speed to the controller, wherein the controller is operable to control the supply of fuel to the combustor in dependence upon the first indication received from the first sensor and the second indication received from the second sensor. The controller may or may not be incorporated as part of the gas turbine engine.

According to a further aspect of the invention there is provided a method of controlling the acceleration of an aero-engine from idle, comprising the steps of: a) sensing the speed of the first compression stage; b) sensing the speed of the second compression stage; and c) controlling the supply of fuel in dependence upon steps a) and b).

According to a still further aspect of the present invention there is provided an acceleration controller for a gas turbine engine comprising: a first input for receiving an indication of the speed of a first compression stage; a second input for receiving an indication of the speed of a second compression stage; and processing means operable to control the supply of fuel to the engine in dependence upon the indications received at the first and second inputs.

The inventor has realised that at low speeds the HPC does most of the compression work, and cannot sustain a rapid acceleration rate without a large HPC working line excursion. The HPC working line excursion arises at low speeds, because at low engine speeds the HPC does most of the compression work and more fuel is required to hit a scheduled acceleration target. The HPC is therefore hard to accelerate. A corollary is that less compression work is done by other spools and they are easier to accelerate. As the speed of the engine increases, the other spools do more of the compression work. The inventor has realised the importance of taking into account the different and varying behaviour of the multiple spools during acceleration from idle.

The inventor has realised the importance of taking into account the contribution the spool(s) other than the HPC spool make to the acceleration of the engine from idle. The kinetic energy of the other spool(s) may be taken into account by using a composite speed parameter as the speed in a closed loop speed derivative acceleration control system. Thus the working line excursion of the HPC is substantially reduced on acceleration from minimum idle and therefore less surge margin has been designed into the engine. As a consequence, the engine can be run at higher pressure and with greater efficiency.

For a better understanding of the present invention reference will now be made by way of example only to the accompanying drawings in which.

Figure 1:
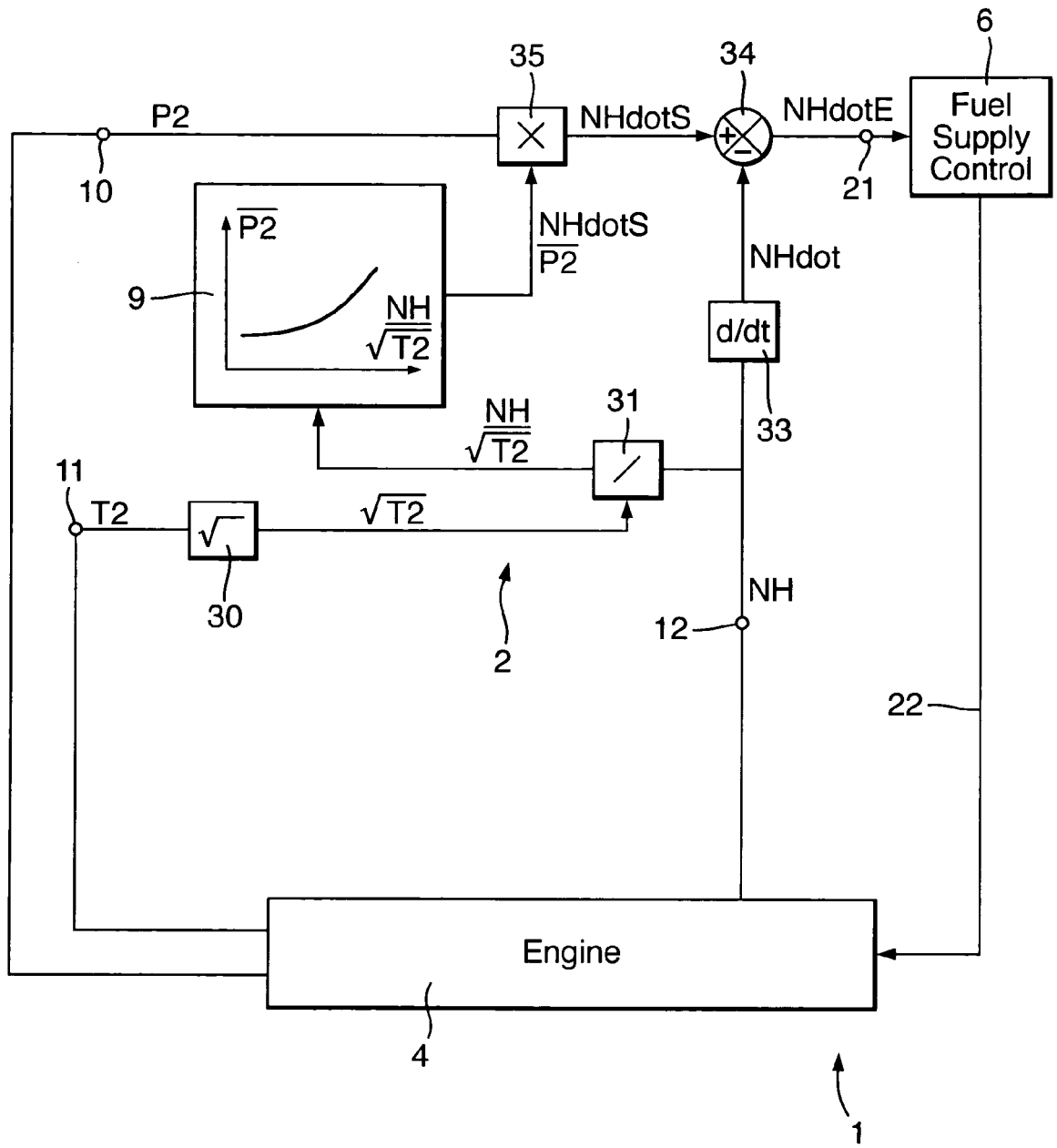
FIG. 1 illustrates a present-day closed loop speed derivative acceleration control system.
Figure 2:
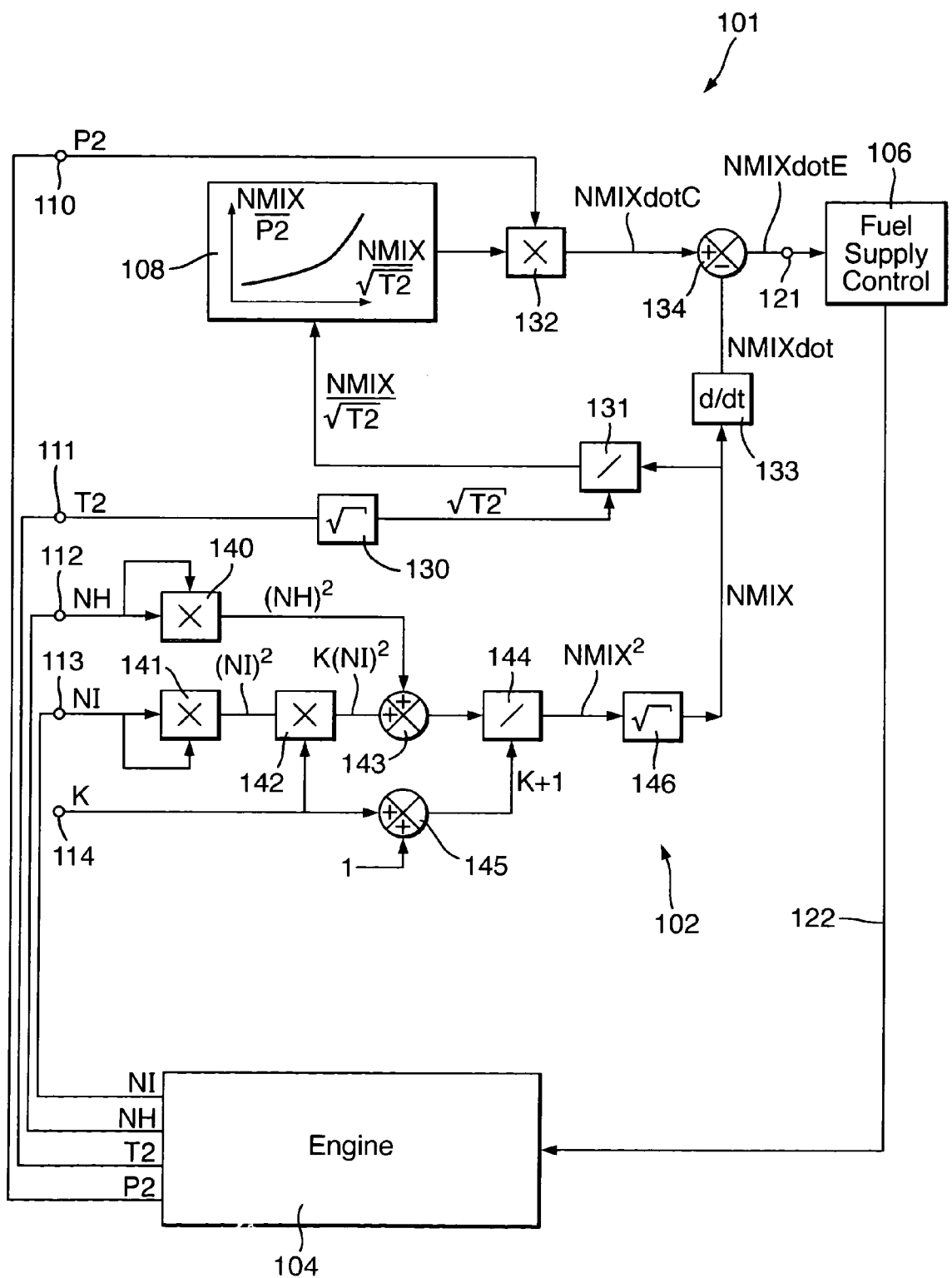
FIG. 2 illustrates a closed loop composite-speed derivative acceleration control system.
Figure 3:
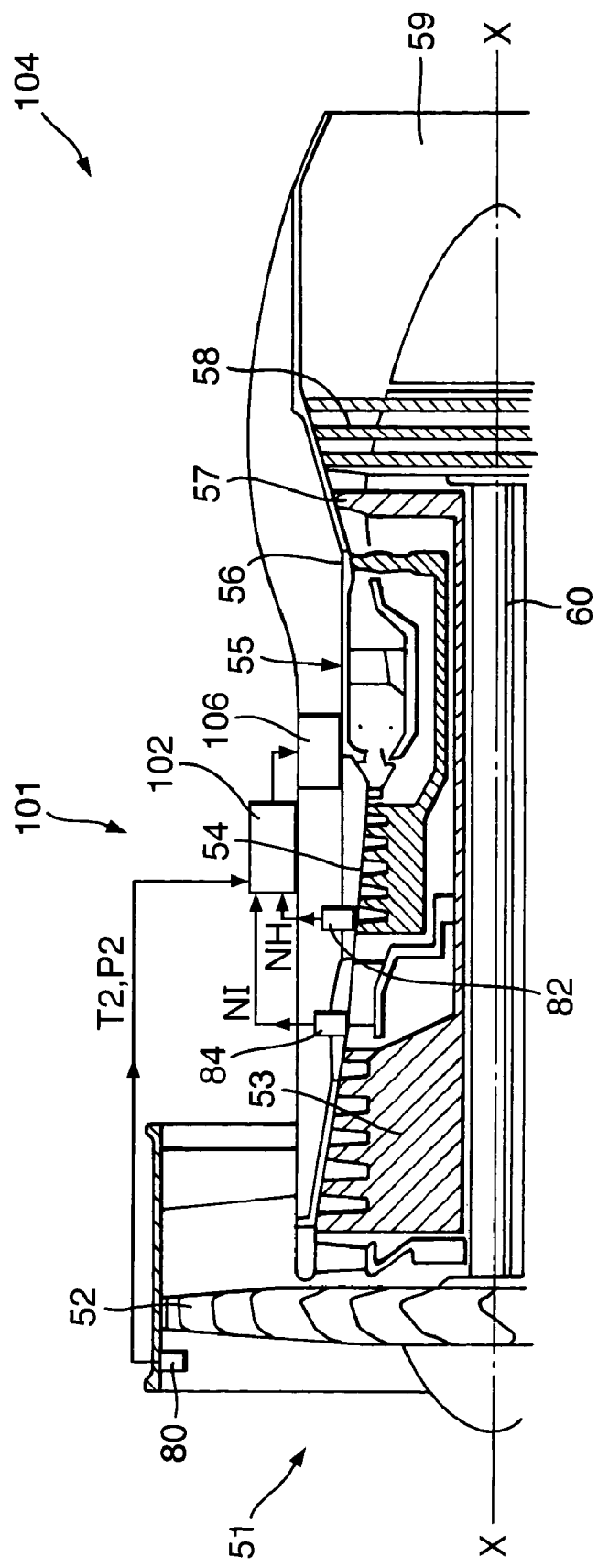
FIG. 3 illustrates a sectional side view of the upper half of a multi-spool aero-engine 104 that incorporates a closed loop composite-speed derivative acceleration control system.

The FIGS. 2 and 3 illustrate a gas turbine engine system comprising: a first compression stage (HPC 54); a second compression stage (IPC 53); a combustor (55); a controller (102); a first sensor (82) for sensing the speed of the first compression stage and providing a first indication (NH) of the sensed speed to the controller (102); and a second sensor (84) for sensing the speed of the second compression stage and providing a second indication (NI) of the sensed speed to the controller (102), wherein the controller (102) is operable to control the supply of fuel to the combustor in dependence upon the first indication (NH) received from the first sensor (82) and the second indication (NI) received from the second sensor (84).

The kinetic energy of a multi-spool engine may be approximated to the sum of the kinetic energies of the high pressure compressor (HPC) spool and the intermediate compressor (IPC) spool.

$$\text{Kinetic Energy (KE)} = 0.5 * J_I * \omega_I^2 + 0.5 * J_H * \omega_H^2 = 0.5 * J_I * (2\pi/60 * NI_{100} * NI/100)^2 + 0.5 * J_H * (2\pi/60 * NH_{100} * NH/100)^2 \quad (1)$$

where $J_H$ is the moment of inertia of the HPC spool, $NH_{100}$ is the maximum speed of the HPC spool (rpm), NH is the instantaneous (percentage) HPC spool speed, expressed as a percentage of $NH_{100}$ $J_I$ is the moment of inertia of the IPC spool, $NI_{100}$ is the maximum attainable speed of the IPC spool (rpm), NI is the instantaneous (percentage) IPC spool speed, expressed as a percentage of $NI_{100}$ A composite speed parameter, NMIX, is defined such that:

$$KE = 0.5 * J_H * (2\pi/60 * NH_{100} * NMIX)^2 + 0.5 * J_I * (2\pi/60 * NI_{100} * NMIX)^2 \quad (2)$$

equating (1) with (2) gives $$NMIX = \text{SQRT}((K * NI^2 + NH^2)/(K+1))$$

where the inertia weighting constant K is such that:

$$K = (J_I/J_H) * (NI_{100}/NH_{100})^2$$

For a typical large modern turbo fan $$K = (112/396) * (8300/12200)^2 = 1120/398 \approx 1.3114$$

The derivative of the composite speed NMIX, the composite-speed derivative NMIXdot, can be used to control the engine using a closed-loop composite-speed derivative acceleration control system 101. One such system is schematically illustrated in FIG. 2.

FIG. 2 illustrates a closed loop composite-speed derivative acceleration control system 101 suitable for controlling the acceleration of a multi-spool engine 104 from approach and/or minimum idle to a predetermined speed within a predetermined time. The system 101 provides a consistent acceleration times while avoiding surge.

The system 101 includes a controller 102, a fuel supply controller 106 and an engine 104. The controller 102 has a first input node 110, a second input node 111, a third input node 112, a fourth input node 113, a fifth input node 114 and an output node 121. The first, second, third and fourth input nodes are connected to the engine 104. The output node 121 is connected to the fuel supply controller 106, which controls the fuel input 122 to the engine 104. The closed loop controls the rate of change of a composite speed parameter NMIX by modulating the fuel supplied to the engine's combustor using the fuel supply controller 6.

The first input node 110 receives a value P2 that represents the engine inlet stagnation pressure divided by the sea level reference pressure. The second input node 111 receives a value T2 that represents the engine inlet stagnation temperature divided by the sea level reference temperature. The third input node 112 receives a value NH that represents the instantaneous speed of the high pressure compressor (HPC) shaft. The fourth input node 113 receives a value NI that represents the instantaneous speed of the intermediate pressure compressor (IPC) shaft. The fifth input node receives a value of the inertia weighting constant K or the values for calculating K.

The controller 102 uses a predetermined schedule 108, which schedules the rate of change of the composite speed parameter against engine power level and flight conditions. A corrected rate of change of the composite speed parameter (corrected composite acceleration) is scheduled against a corrected instantaneous composite speed parameter. This schedule is designed so that a predetermined engine thrust can be achieved within a predetermined time from idle. The corrected composite acceleration is given by NMIXdotS/P2, where NMIXdotS is the scheduled rate of change of the composite sped parameter NMIX. The corrected composite speed parameter is given by NMIX/$\sqrt{T2}$. The schedule may be defined as NMIXdotS/P2=f(NMIX/$\sqrt{T2}$).

The values T2 and P2 are thermodynamic variables. The square root of T2 is a turbo machinery correction parameter that takes account of the speed of sound which is proportional to the square root of temperature. P2 is a measure of the amount of air going through the engine. As the altitude of the aircraft increases P2 decreases, more work is required to produce the same amount of mass flow by the engines. As the aircraft speed increases the pressure increases and less work is required for the same mass flow.

In the controller 102, T2 is square rooted 130. The instantaneous composite speed parameter NMIX is divided 131 by the square root of T2 to create a corrected instantaneous composite speed parameter. The corrected instantaneous speed parameter is input to the schedule 108. The schedule 108 outputs the scheduled corrected acceleration value NHdotS/P2. This is multiplied 132 by P2 to produce the scheduled acceleration NMIXdotS. Meanwhile, the instantaneous composite speed parameter NMIX is differentiated 133 with respect to time to find the actual composite acceleration NMIXdot. The actual composite acceleration NMIXdot is subtracted 134 from the scheduled composite acceleration NMIXdotS to produce an error signal NMIXdotE, which represents how much the acceleration of the engine is off-schedule. The error signal NMIXdotE is output from the output node 121 to the fuel controller 106 which directly controls the amount of fuel supplied to the engine 104 and consequently the rate of change of the composite speed NMIX. Thus a closed loop control system is formed using composite-speed derivative control that gives consistent acceleration times.

The controller 102 creates the composite speed parameter NMIX from the values provided to its third, fourth and fifth input nodes as follows. A first parameter ($NH^2$) is formed by squaring 140 the HPC instantaneous speed NH received at the third input node 112. A second parameter ($NI^2$) is formed by squaring 141 the IPC instantaneous speed NI received at the fourth input node 113. The second parameter is multiplied 142 by the inertia weighting constant K and the product is added 143 to the first parameter. The resultant sum is divided 144 by an inertia weighting denominator (K+1) created by adding 145 one to the inertia weighting constant K. The result of the division is square rooted 146 to produce the composite speed parameter NMIX.

The controller 102 may be, for example, a programmed microprocessor or a micro-controller.

FIG. 3 illustrates a sectional side view of the upper half of a multi-spool aero-engine 104 that incorporates a closed loop composite-speed derivative acceleration control system 101 as described in FIG. 2. The aero-engine 104 comprises, in axial flow series, an air intake 51, a propulsive fan 52, an intermediate pressure compressor (IPC) 53, a high pressure compressor (HPC) 54, a combustor 55, a turbine arrangement comprising a high pressure turbine 56, an intermediate pressure turbine 57 and a low pressure turbine 58 and an exhaust nozzle 59. The aero-engine 104 further comprises interconnecting shafts 60.

The aero-engine 104 operates in a conventional manner so that air entering into the air intake 51 is accelerated by the propulsive fan 52 which produces two air flows: a first air flow into the intermediate pressure compressor 53 and a second air flow which provides propulsive thrust. The intermediate pressure compressor 53 compresses air flow directed into it for delivering that air to the high pressure compressor 54 where further compression takes place. The compressed air exhausted from the high pressure compressor 54 is directed into the combustor 55 where it is mixed with fuel and the mixture combusted. The resultant hot combustion products then expand and thereby drive the high, intermediate and low pressure turbines 56, 57, 58 before being exhausted through the nozzle 59 to provide additional propulsive thrust. The high, intermediate and low pressure turbines 56, 57, 58 respectively drive the high and intermediate pressure compressors 54, 53 and the propulsive fan 52 by suitable interconnecting shafts 60. The high pressure turbine 56, the high pressure compressor 54 and their interconnecting shaft form a first spool. The intermediate pressure turbine 57, the intermediate pressure compressor 53 and their interconnecting shaft form a second spool. The low pressure turbine 58, the propulsive fan 52 and their interconnecting shaft form a third spool.

The aero-engine 110 additionally comprises a probe 80 located in the air intake 510, a first speed sensor 82 coupled to the first spool and a second speed sensor 84 coupled to the second spool. In this embodiment the entirety of the acceleration control system 101 is located at the engine and the engine 104 also comprises the controller 102 and the fuel supply controller 106. The acceleration control system 101 is capable of consistently controlling the acceleration of the multi-spool engine 104 from approach and/or minimum idle to a predetermined speed within a predetermined time as described with relation to FIG. 2.

The probe 80 measures the inlet stagnation pressure P2 and inlet stagnation temperature T2 and provides them respectively as inputs to the first input node 110 and second input node 112 of the controller 102. The first speed sensor 82 measures the speed NH of the first, high pressure compressor (HPC), spool and provides this as an input to the third input node 112 of the controller 102. The second speed sensor 84 measures the speed NI of the second, intermediate pressure compressor (IPC), spool and provides this as an input to the fourth input node 113 of the controller 102. The output node 121 of the controller 102 provides a control input signal to the fuel supply controller 106, which modulates the amount of fuel provided to combustor 55.

The value of the inertia weighting constant K is provided to the fifth input node 114 of the controller 102. This value is programmable.

Although embodiments of the present invention have been described in the preceding paragraphs with reference to various examples, it should be appreciated that modifications to the examples given can be made without departing from the scope of the invention as claimed. For example, although the above described implementation takes account of two spools in the calculation of the composite speed parameter, in other implementations more than two spools may be taken into account.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A gas turbine engine system comprising:
a first compression stage;
a second compression stage;
a combustor;
a controller;
a first sensor for sensing the speed of the first compression stage and providing a first indication of the sensed speed to the controller; and
a second sensor for sensing the speed of the second compression stage and providing a second indication of the sensed speed to the controller,
wherein the controller is operable to control the supply of fuel to the combustor in dependence upon the first indication received from the first sensor and the second indication received from the second sensor, wherein the controller is operable to create a composite parameter from the received first and second indications, and wherein the composite parameter is created from the combination of the first indication and the second indication in different proportions.

2. A gas turbine engine system as claimed in claim 1, wherein the proportions are dependent upon the moments of inertia of the spool(s) for the first compression stage and the spool(s) for the second compression stage.

3. A gas turbine engine system as claimed in claim 1, wherein the proportions reflect the kinetic energy of the spool(s) for the first compression stage and the kinetic energy of the spool(s) for the second compression stage.

4. A gas turbine engine system as claimed in claim 1, wherein the composite parameter is representative of at least the kinetic energy of the first and second compression stages.

5. A gas turbine engine system as claimed in claim 1, wherein the controller forms part of a feedback system operable to control the rate of change of the composite parameter.

6. A gas turbine engine system comprising:
a first compression stage;
a second compression stage;
a combustor;
a controller;
a first sensor for sensing the speed of the first compression stage and providing a first indication of the sensed speed to the controller; and
a second sensor for sensing the speed of the second compression stage and providing a second indication of the sensed speed to the controller,
wherein the controller is operable to control the supply of fuel to the combustor in dependence upon the first indication received from the first sensor and the second indication received from the second sensor,
wherein the controller is operable to determine a target value and a current value using the first and second indications and to compare the target value and the current value, and
wherein the control of the fuel supply to the combustor is dependent upon the comparison.

7. A gas turbine engine system as claimed in claim 6, wherein the determination of the target value includes thermodynamic corrections.

8. A gas turbine engine system as claimed in claim 6, wherein the determination of the target value additionally uses an engine pressure indication.

9. A gas turbine engine system as claimed in claim 6, wherein the determination of the target value additionally uses an engine temperature indication.

10. A gas turbine engine system as claimed in claim 6, wherein the target value is a target rate of change of a composite parameter.

11. A gas turbine engine system as claimed in claim 10, wherein the controller is operable to determine, from a current value of the composite parameter, the target rate of change of the composite parameter.

12. A gas turbine engine system as claimed in claim 11, wherein the controller is operable to correct the composite parameter using an engine temperature indication and to use the corrected composite parameter to determine the target rate of change of the composite parameter.

13. A gas turbine engine system as claimed in claim 12, wherein the controller stores a predetermined schedule of rates of change of the composite parameter against the corrected composite parameter, for determining the target rate of change of the composite parameter.

14. A gas turbine engine system as claimed in claim 6, wherein the current value is the actual rate of change of the composite parameter.

15. A gas turbine engine system as claimed in claim 1, further comprising a temperature sensor for providing an engine temperature indication to the controller.

16. A gas turbine engine system as claimed in claim 15, wherein the temperature sensor is located at the engine inlet.

17. A gas turbine engine system as claimed in claim 1, further comprising a pressure sensor for providing a pressure indication to the controller.

18. A gas turbine engine system as claimed in claim 17, wherein the pressure sensor is located at the engine inlet.

19. A multi-spool gas turbine engine system comprising:
a first spool;
a second spool;
a combustor;
a controller;
a first sensor for sensing the speed of the first spool and providing a first indication of the sensed speed to the controller; and
a second sensor for sensing the speed of the second spool and providing a second indication of the sensed speed to the controller,
wherein the controller is operable to control the supply of fuel to the combustor in dependence upon the first indication received from the first sensor and the second indication received from the second sensor,
wherein the controller is operable to create a composite parameter from the received first and second indications, and
wherein the composite parameter is created from the combination of the first indication and the second indication in different proportions.

20. An acceleration controller for a gas turbine engine comprising:
a first input for receiving an indication of the speed of a first compression stage;
a second input for receiving an indication of the speed of a second compression stage; and
processing means operable to control the supply of fuel to the engine in dependence upon the indications received at the first and second inputs, and operable to determine a target value and a current value using the indication received at the first input and the indication received at the second input and to compare the target value and the current value, wherein the control of the fuel supply to the combustor is dependent upon the comparison.

* * * * *